INVENTOR.
FRANK S. PAYERLE
BY Hamilton, Cook,
Renner & Kenner
ATTORNEYS

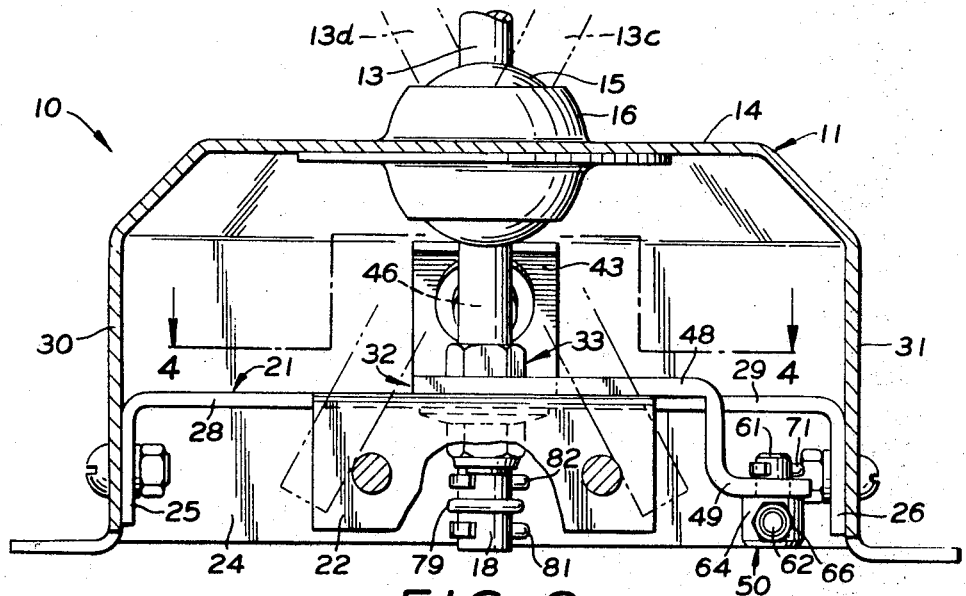
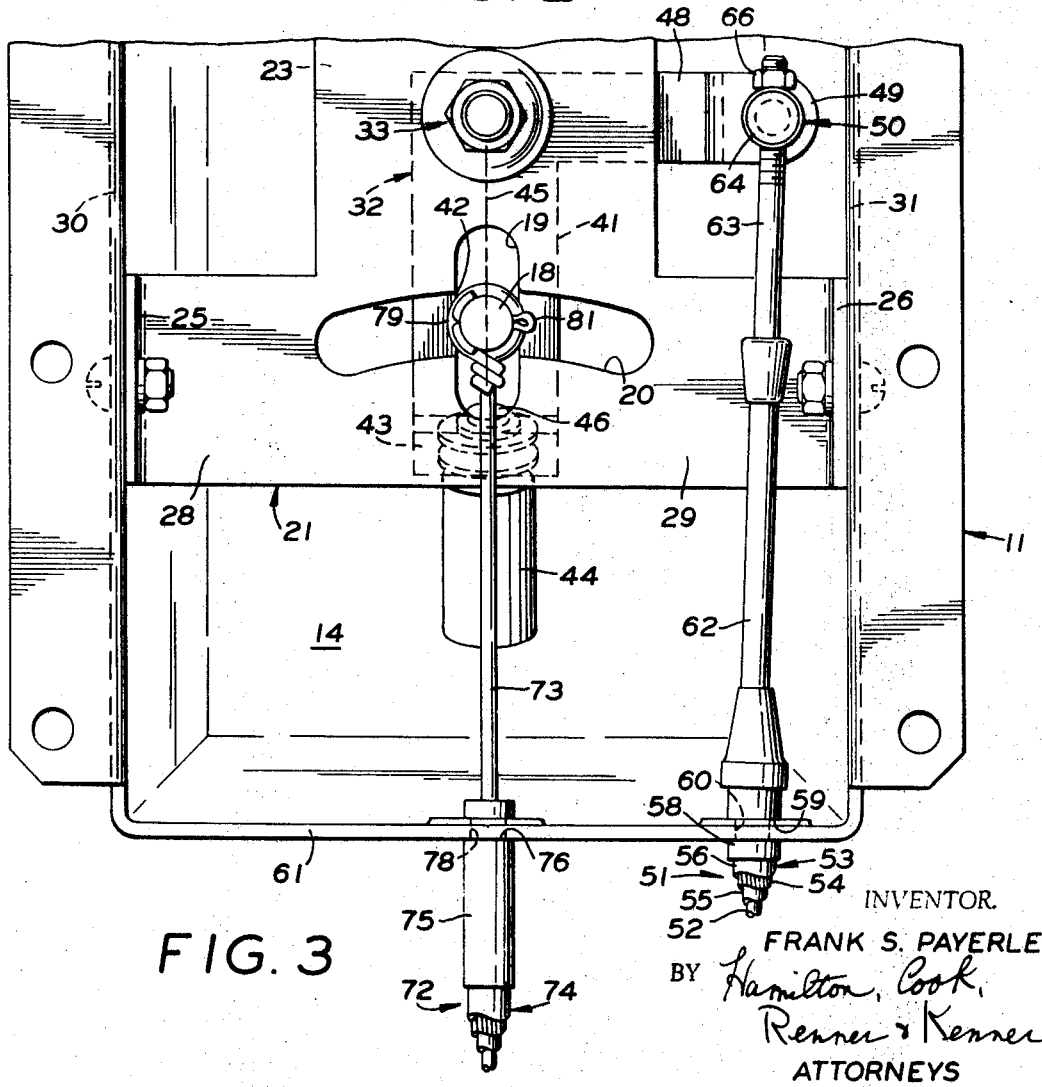

June 30, 1970     F. S. PAYERLE     3,517,568
SINGLE LEVER CONTROL

Filed July 5, 1968     4 Sheets-Sheet 3

INVENTOR.
FRANK S. PAYERLE
BY Hamilton, Cook.
Renner & Kenner
ATTORNEYS

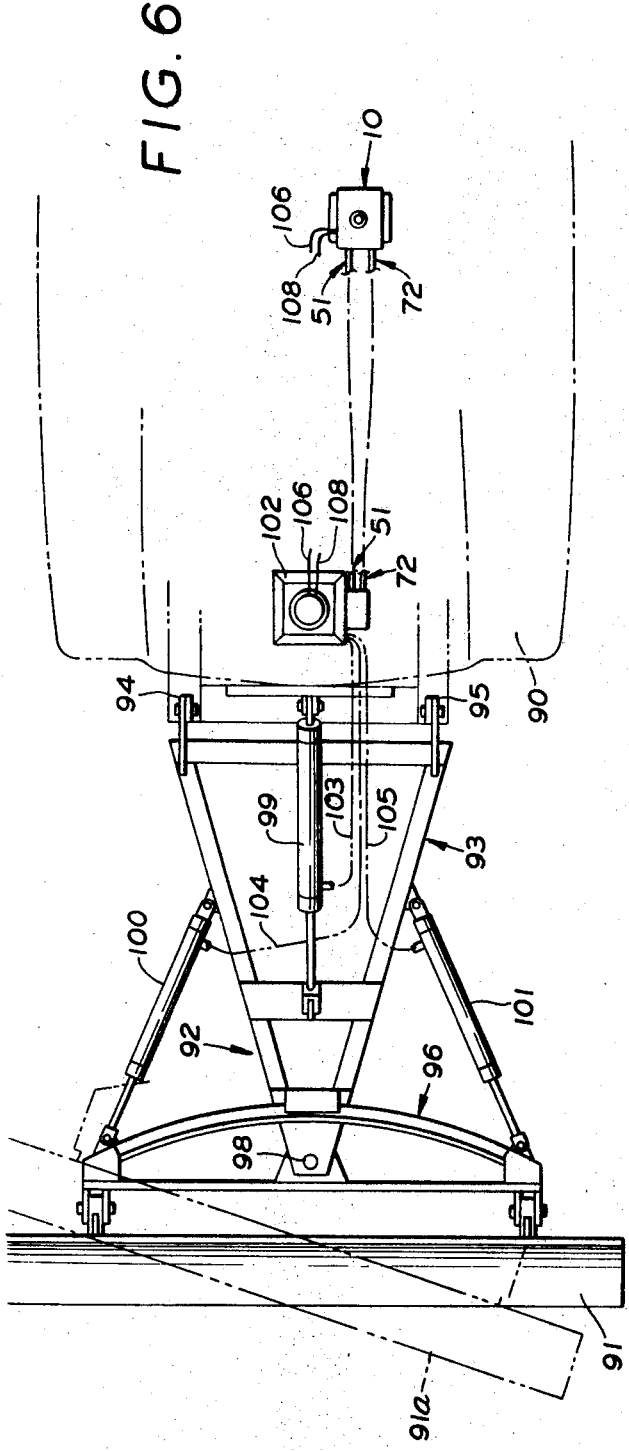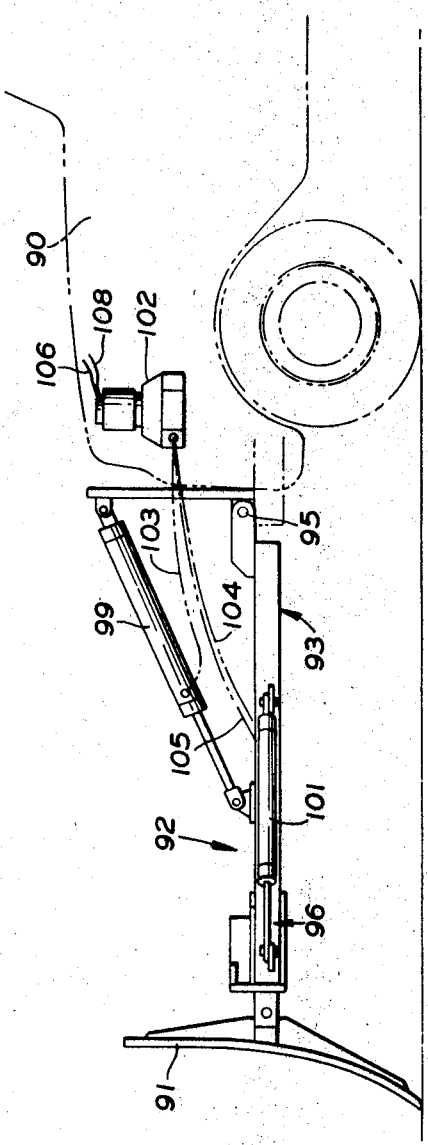

# United States Patent Office 3,517,568
Patented June 30, 1970

3,517,568
SINGLE LEVER CONTROL
Frank S. Payerle, Akron, Ohio, assignor, by mesne assignments, to North American Rockwell Corporation, Pittsburgh, Pa., a corporation of Delaware
Filed July 5, 1968, Ser. No. 742,618
Int. Cl. F16h 21/02
U.S. Cl. 74—471                                     6 Claims

ABSTRACT OF THE DISCLOSURE

A single lever control unit for regulating a plurality of remote, servient mechanisms. Two motion transmitting mechanisms in the nature of push-pull control cables are individually, and selectively, operated by a single lever pivotally mounted in the unit. The core of one cable is attached to a throw arm portion of the lever movable directly with the handle portion of the lever. The core of the second cable is attached to a link plate that is movable in response to specific motion of the throw arm. A guide plate limits motion of the throw arm, and thereby the handle as well, to two, generally transverse courses. Movement of the throw arm along one course effects motion transmission through only one of said push-pull cables and motion of the throw arm along the transverse course effects transmission through only the other of said push-pull cables. A switch means is movably mounted within the unit to be selectively actuated by movement of the throw arm in selective directions along both courses.

BACKGROUND OF THE INVENTION

There are many situations which require individual regulation of two, remote, servient mechanical devices and a remote, servient electrical device. Primitively, such regulation can be effected by separate mechanical controls individually connected to the remote, servient mechanical devices and a further separate electrical control connected to the remote electrical device.

In installations where actuation of the electrical device is required simultaneously with selected actuation of the individual mechanical devices, the prior art employs a plurality of electrical controls in conjunction with an individual control for each servient mechanical device, the individual electrical controls being interlinked by complex wiring arrangements to accomplish the desired simultaneous actuation of the remote electrical device.

The inconvenience of requiring multiple mechanical controls can be readily appreciated, for example, from an understanding of the controls heretofore utilized to regulate the vertical and rotative position of a blade such as an earth scraper or a snowplow. Both vertical and rotative positioning of such blades may be accomplished by hydraulic power cylinders, the cylinders being selectively supplied with pressurized fluid and being selectively permitted to release retained fluid through well-known valve means. Such valve means can be effectively regulated by mechanical motion transmitting means of the type commonly referred to as push-pull control cables. When one control cable is used to regulate the valve means that controls raising and lowering of the blade, and a second control cable is used to regulate the valve means that controls horizontal rotation of the blade, the prior art has heretofore utilized individual control means for each cable.

In addition it is often desirable to have the pump which provides the pressurized fluid operate only while the position of the blade is being adjusted. This has heretofore necessitated the inclusion of a complex, interconnected electrical control means between the individual mechanical control means.

SUMMARY OF THE INVENTION

It is therefore and object of the present invention to provide a control means whereby a single lever can be used to regulate at least two motion transmitting means individually.

It is another object of the present invention to provide a single lever control unit, as above, that will operate an electrical control concurrently with selected regulation of the individual motion transmitting means.

It is a further object of the present invention to provide a single lever control unit, as above, that is relatively uncomplicated and inexpensive to manufacture and maintain and, at the same time, capable of providing a long and useful life under adverse working conditions.

These and other objects, as well as the advantages thereof over existing and prior art forms, will become apparent in view of the following detailed description of the attached drawings and are accomplished by means hereinafter described and claimed.

In general, a single lever control unit embodying the concept of the present invention will actuate two motion transmitting means. A throw arm supported in the housing of the control unit is movable in at least a first and second course by a single handle. The first of the motion transmitting means is connected directly to the throw arm for actuation only when the throw arm is moved along the first course.

A link means is carried on the housing and movable only in response to motion of the throw arm along the second course. The second of the motion transmitting means is connected to this link means for actuation only in response to movement of the throw arm along the second course.

Additionally, an electrical switch means may be carried on the link means for interengagement with the throw arm to make and break a circuit through the switch means in response to selected movement of the throw arm in selected directions along both courses.

One preferred form of the present invention is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 2 is a reduced cross section taken substantially on line 2—2 of FIG. 1;
FIG. 3 is a partial bottom plan on the scale of FIG. 2;
FIG. 6 is a schematic top plan of a snowplow mount operable by a control according to the present invention; and,
FIG. 7 is a schematic side elevation of the snowplow mount depicted in FIG. 6.

DESCRIPTION OF THE PREFERRED EMBODIMENT

Figure 1:
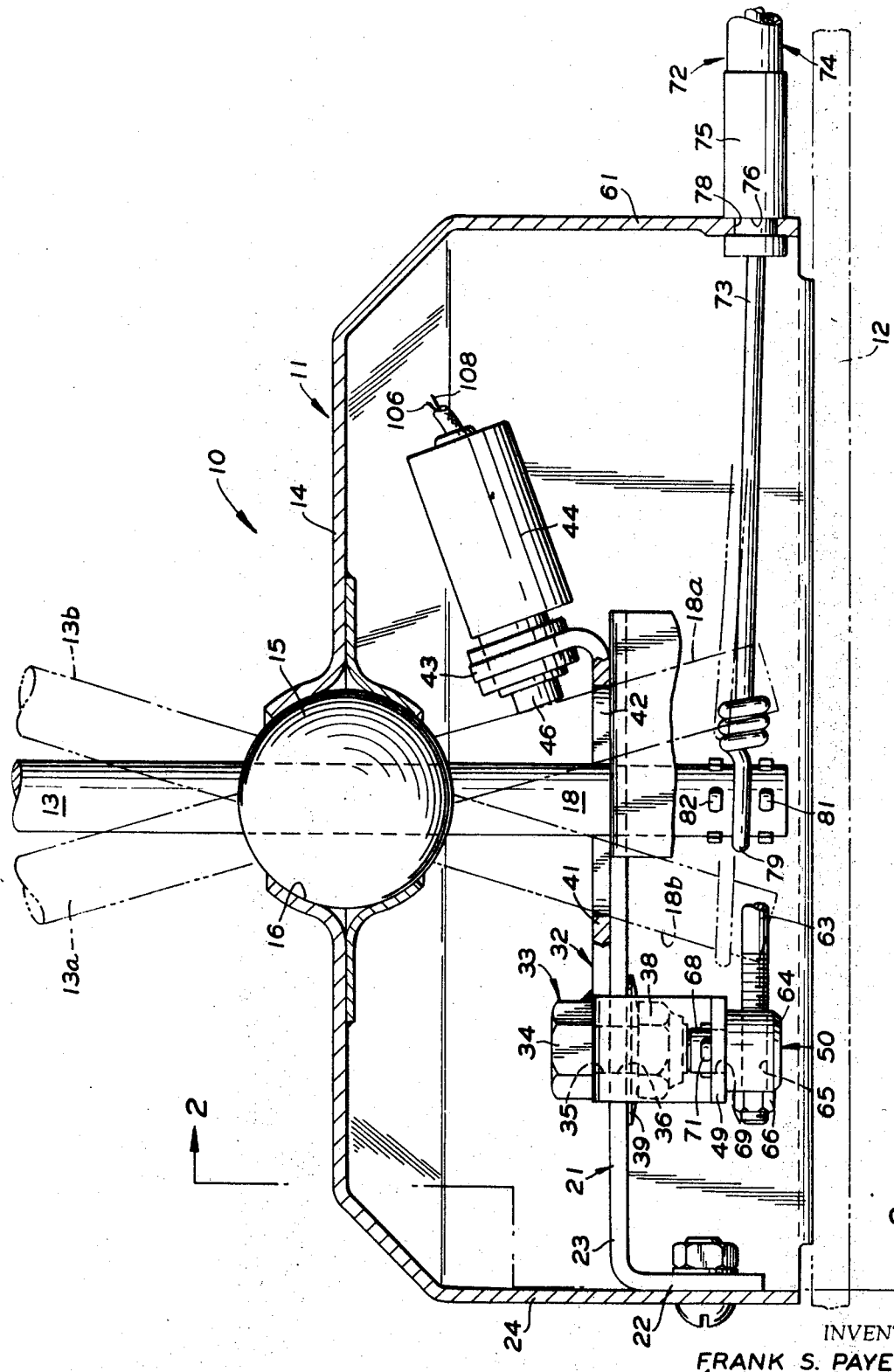
FIG. 1 is a vertical cross section through a single lever control embodying the concept of the present invention.

Referring more particularly to the drawings, a control embodying the concept of the present invention is indicated generally by the numeral 10. The housing 11 of control 10 may be mounted, as on the floorboard 12, with the handle 13 extending generally upwardly through the top wall 14 of the housing 11. Specifically, the handle 13 is secured to, and extends outwardly of, a mounting ball 15 universally pivotal in a socket 16 provided in the top wall 14 of the housing 11.

Extending outwardly from the mounting ball 15 in a direction substantially opposite that of the handle 13 is a throw arm 18. The throw arm 18 extends through the intersecting, slotted apertures 19 and 20 and a guide plate 21 affixed within the housing 11. The guide plate 21 may have a T-shaped configuration (FIG. 3) with a flange 22 (FIG. 1) on the base leg 23 secured to the rear wall 24 of the housing 11 and with flanges 25 and 26 on the arms 28 and 29 of the T-shaped guide plate 21 secured to the side walls 30 and 31 of the housing 11, respectively. The aperture 19 is generally linear and is medially and transversely intersected by the curvilinear aperture 20.

An L-shaped link plate 32 is juxtaposed to the upper side of the guide plate 21 and swings about pivot connection 33 by which it is secured thereto.

The pivotal connection 33 may comprise a bolt 34 fixed to the link plate and extending through bores 35 and 36 in the link plate 21 and swing plate 32, respectively, and secured by a nut 38 tightened against a bowed washer 39. If nut 38 is an elastic stop nut it will not tighten, on use, sufficiently to bind the swing plate 32 to the guide plate 21, nor will it work loose. One arm 41 of the swing plate 32 also has a linearly slotted aperture 42 which registers with the linear aperture 19 in the guide plate 21 when the control is in neutral position (FIG. 3), and also receives the throw arm 18 therethrough. A portion of the arm 41 of the L-shaped swing plate 32 forms a bracket 43 on which a button switch 49 is mounted. The switch 44 and bracket 43 are so oriented that the axis 45 of the linear aperture 42 is aligned with the path along which the button 46 of switch 44 moves during actuation, as will be more fully hereinafter explained.

The other arm 48 of the L-shaped swing plate 32 has a stepped bracket 49 that carries a trunnion connector 50 which extends beneath the guide plate 21. A motion transmitting means, such as push-pull control cable 51, is operatively attached to the trunnion connector 50. The push-pull cable 51 may be of any conventional construction having a core 52 reciprocably slidable within a casing 53 to transmit mechanical motion by the application of either tensile or compressive forces to the core 52. In the exemplary construction depicted, the casing 53 is formed of a plurality of casing wires 54 laid contiguously, in the form of a long pitched helical coil, about the radially outer surface of an inner, flexible, plastic tube 55 which extends the full length of the casing 53. An outer cover 56 encases the coil of wires 54 up to within a short distance from the ends thereof.

A fitting 58 is positioned over the end of the cable casing 53 and is cold swaged, or otherwise suitably connected, onto the exposed portion of the cylindrical grouping of wires 54. A plurality of annular ribs, not shown, may be provided within the fitting 58 which, when crimped onto the cover 56, effect a seal between the end fitting 58 and the cover 56.

A retaining groove 59 is provided on the exterior of the fitting 58 for engagement with the edge of a notch 60 in the forward wall 61 of the housing 11 whereby the cable casing 53 is secured thereto.

An extension tube 62 is swivelly mounted on the fitting 58, as by a socket arrangement not shown. The extension tube slidably receives the end rod 63, one end of which is connected to the end of the core 52. The extension tube 62 is closely fitted around the end rod 63 to guide the rod and to prevent excessive deflection of that portion of the core 52 sliding therein, when subjected to compressive loads. The opposite end of rod 63 is secured to the trunnion connector 50. As shown in FIG. 1, the head portion 64 of the trunnion connector 50 is transversely bored, at 65, to receive the end rod 63. The bore 65 may be threaded matingly to receive the correspondingly threaded end rod 63, and a lock nut 66 assures the connection.

A stem 68 extends axially of the head portion 64 and is rotatably received within a bore 69 through the stepped bracket 49. A cotter pin 71 retains the trunnion connector 50 rotatably mounted on the bracket 49.

Another motion transmitting means, such as push-pull control cable 72, is operatively attached to the throw arm 18. The control cable 72, like cable 51, may be of any conventional construction having a core 73 slidably received within a casing 74. An end fitting 75 is also secured to casing 74 and it too has an annular retaining groove 76 in the exterior surface thereof for engagement with the edge of a notch 78 on the forward wall 61 of the housing 11 whereby the casing 74 may be anchored to the housing.

The core 73, which may be of the solid wire variety, extends without a restraining cover between the fitting 75 and the throw arm 18, the purpose for which will be more fully hereinafter described. The end of the core 73 may be bent in a loop 79 and wrapped on itself, as at 80, to secure the loop 79. With the loop 79 received over the throw arm 18 a pair of cotter pins 81 and 82 received through bores 83 and 84 above and below the loop 79, respectively, retain the loop 79 of core 73 over the throw arm 18.

The operation of the subject control 10 is probably best understood in the environment of a snowplow, and particularly one in which both lift and turn control are provided.

Referring to FIGS. 6 and 7, a utility vehicle 90 is provided with a blade 91. A typical mount attaches the blade to the vehicle through a compound frame 92. A first frame member 93 is generally triangular with a pair of laterally spaced, pivotal connections 94 and 95 securing the base thereof to the vehicle 90 for vertically swinging movement. A second frame member 96 is pivotally mounted to the apex of the first frame member 93, as at 98, for horizontal swinging movement. Blade 91 is carried directly on the second frame member 96.

A first cylinder 99 is secured between the vehicle 90 and the first frame member 93 to raise and lower the frame 92, and blade 91, about the pivotal connections 94 and 95. The second and third cylinders 100 and 101 are attached between opposite sides of the first frame member 93 and the second frame member 96 to swing the second frame member 96, and blade 91, horizontally about the pivot 98.

A pump and valve unit 102 contains a fluid reservoir, a fluid pump and a valving arrangement whereby fluid may be selectively pumped, under pressure, to the three cylinders 99, 100 and 101 through conduits 103, 104 and 105, respectively.

With the handle 13 oriented vertically, as shown in the solid line representation of FIG. 1, the cores 52 and 73 are retained in their neutral position and the position of along an arc through the plane including the axis 45 of the registered, linear apertures 19 and 42 to the chain-line position 13a causes the throw arm 18 to move in an opposite direction along the course defined by apertures 19 and 42 to the chain-line position 18a (FIG. 1). This movement translates the core 73 axially inwardly with respect to the casing 74 and at the same time brings the throw arm into contact with and depresses the button 46 on switch 44. With the button 46 depressed a closed circuit is created through the wires 106 and 108 leading from the switch 44 to the pump, not shown, in unit 102 to activate the pump. The afore-described axial movement of the core 73 positions a valve, also not shown, within unit 102 and at the opposite end of cable 72 so that fluid is pumped through hose 103 to cylinder 99. The admission of pressurized fluid into cylinder 99 raises the frame 92 about the pivotal connections 94 and 95 to raise the blade. The blade 91 is raised to the desired height, and the handle 13 is then returned from the chain-line position 13a to the solid line position 13. This movement retracts the throw arm 18 from the button 46 to break the circuit through wires 106 and 108 and thereby stop the pump. The same movement of throw arm 18 also returns the core 73 to the neutral positions. In the neutral position the valve in unit 102 causes the pressurized fluid to be retained within cylinder 99, thus maintaining the blade 91 in the elevated position selected.

To lower the plate 91 the handle is moved from the solid line representation 13 to a position depicted by the chain-line representation 13b. This movement of handle 13 to a position opposite position 13a swings the throw arm 18 in a reverse direction along the course defined by apertures 19 and 42; that is, away from the button 46 on switch 44 so that the pump remains inoperative. However, this movement of throw arm 18 to the chain-line position 18b translates the core 73 axially outwardly of the casing 74, and this motion of core 73 opens the valve, not shown, in unit 102 so that the pressurized fluid in cylinder 99 is relieved. The weight of blade 91 and frame 92 thereby lowers the blade 91 about the pivotal connections 94 and 95. When the blade 91 is lowered to the desired elevation, the handle is swung from position 13b to position 13. This movement returns the core 73 to its neutral position so that the valve unit 102 is closed and the vertical position of blade 91 is maintained, as desired.

It should be observed that when the throw arm swings in response to the swing of handle 13 to and from position 13a or 13b the vertical component of motion of the connection point between the throw arm 18 and the core 73 is accommodated by having the core extend without restriction between the fitting 75 and throw arm 18.

Should it be desired to swing the blade 91 to either the right or the left, irrespective of the elevation thereof, this can be accomplished by correspondingly swinging the handle 13 to one direction or the other. For example, should one desire to swing the blade 91 to the right, position 91a depicted in chain-line in FIG. 6, he swings the handle 13 laterally to the right, to position 13c shown in chain-line in FIG. 2. Lateral movement of handle 13 to position 13c results in a concomitant swing of the throw arm 18 to position 18c depicted in FIG. 5, and the throw arm, to move laterally, must be positioned at the intersection of slotted apertures 19 and 20 in guide plate 21. Accordingly, with the handle 13 in neutral position it can be swung laterally and this lateral swinging of handle 13 moves the throw arm 18 into and along the course defined by the slotted aperture 20.

Figure 5:
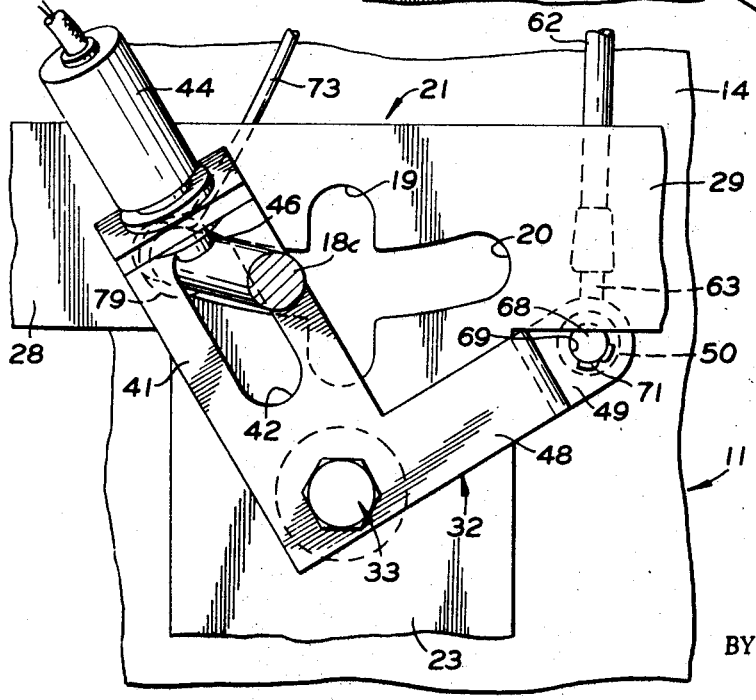
FIG. 5 is a view similar to FIG. 4 depicting the link plate swung counterclockwise from the neutral position represented in FIG. 2.

Because the link plate 32 has only an aperture 42 that registers with aperture 19, when the throw arm moves laterally of aperture 19 toward position 18c it engages the corresponding side wall of aperture 42 and thus pivots the link plate 32 about connection 33 in a counterclockwise direction as viewed in FIG. 5. As the throw arm traverses the full extent of the aperture 20 laterally outwardly of aperture 19 three mechanical functions occur simultaneously.

First, the core 73 swings laterally with the throw arm 18, but because the aperture 20 is curvilinear there will be no relative axial movement of the core 73 with respect to its casing 74. As a result, the valve operated by control cable 72 will not be activated and the vertical disposition of blade 91 will remain uneffected.

For all practical purposes the aperture 20 may be substantially arcuate about a center 107 located at approximately the exit point of the core 73 from the fitting 75. An aperture arcuate about center 107 will theoretically preclude any undesirable impartation of axial displacement to the core 73 as the throw arm moves laterally of the neutral position. However, it must be remembered that lateral movement of the throw arm 18 also engenders a modicum of vertical displacement to the loop 79, as indicated in FIG. 2, so that some additional accommodation may be included within the curvature of aperture 20 to preclude axial translation of the core 73 incident to this vertical displacement. Still further, the core 73 does not extend in a straight line between the fitting 75 and the throw arm 18 when the latter has been swung laterally of its neutral position, but rather bends along a generally parabolic curve. Here too, some additional accommodation may be included within the curvature of aperture 20 to preclude axial translation of core 73 incident to this bending thereof. Accordingly, should an installation require minimal movement of core 73 during actuation of core 52, aperture 20 may be hyperbolic.

This unrestricted flexure of the core 73 between fitting 75 and throw arm 18 allows a shorter coupling therebetween, and constitutes an installation for which a solid wire core is quite suitable.

Second, as the link plate 32 pivots counterclockwise in response to the motion of the throw arm 18 toward position 18c, the switch 44 is carried along an arcuate path that brings the button 46 thereof into depressing engagement with the arm 18. This depression of button 46 closes the circuit through wires 106 and 108 and thereby activates the pump in unit 102.

Third, as the link plate 32 pivots counterclockwise in response to the motion of throw arm 18, the trunnion connector 50 swings along an arcuate path about connection 33 to move the core 52 of control cable 51 axially with respect to its casing 53. The axial insertion of core 52 resulting as handle 13 is swung to position 13c operates a valve in unit 102 that opens the conduit 105 to permit pressurized fluid to enter cylinder 101 and at the same time opens conduit 104 to permit a corresponding amount of fluid to emit from cylinder 100 so that the blade 91 will be swung to position 91a.

When the blade 91 is in the desired position 91a, the handle is moved from the chain-line position 13c back to the neutral position 13. This reverses the movements of throw arm 18 and swings link 32 clockwise to release the throw arm 18 from button 46 in order to close the valve in unit 102 operated by the cable 51 and to break the circuit through switch 44. The blade is thereby retained in position 91a.

Figure 4:
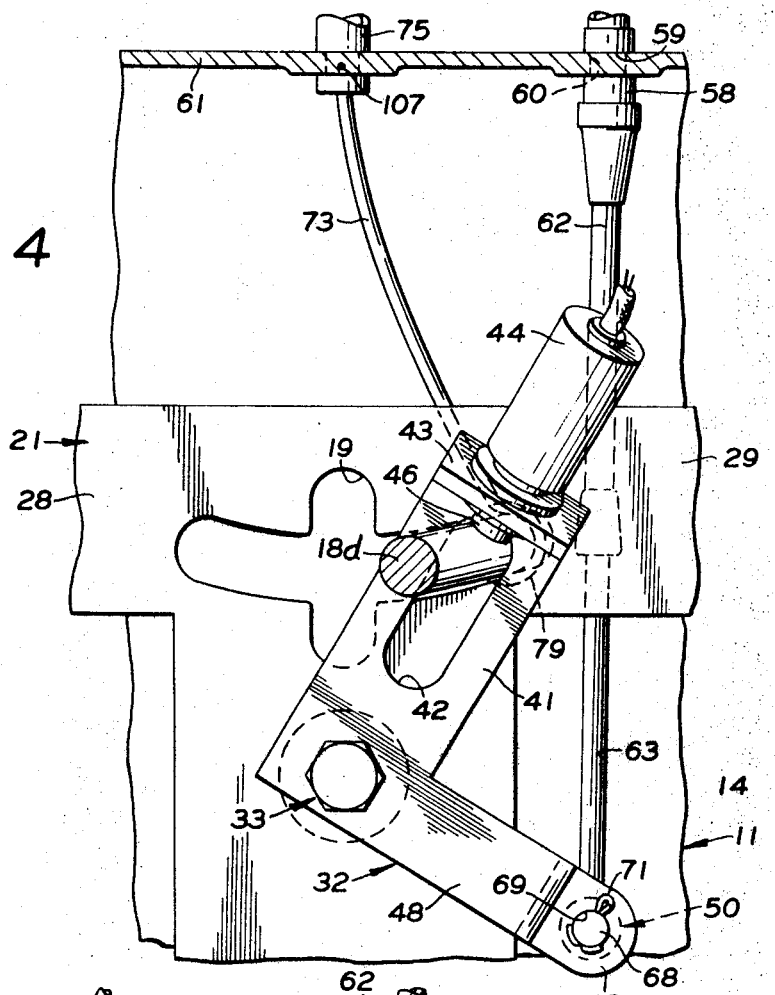
FIG. 4 is a partial horizontal cross section taken substantially on line 4—4 of FIG. 2 but depicting the link plate swung clockwise from the neutral position represented in FIG. 2.

To move the blade in the opposite direction the handle 13 is moved laterally in the opposite direction, to position 13d (FIG. 2). In this direction too, three mechanical functions simultaneously occur. The first two are generally the same as described above in conjunction with movement of blade 91 to the right, except that the link 32 swings clockwise (FIG. 4) in response to movement of the throw arm to position 18d. The third is that the end rod 63 is moved axially outwardly with respect to the extension tube 62. The corresponding movement of core 52 operates a valve in unit 102 that opens conduit 104 to permit pressurized fluid to enter cylinder 100 and at the same time opens conduit 105 to permit a corresponding amount of fluid to emit from cylinder 101. In this situation, as well, when the blade 91 has been swung the desired amount, the handle is returned to the neutral position.

It should now be apparent that a single lever control embodying the concept of the present invention is capable of individually regulating at least two motion transmitting means and an electrical switch means concurrently with selected regulation of the motion transmitting means while otherwise also accomplishing the objects of the invention.

What I claim is:

1. A single lever control device for selectively actuating a first and second motion transmitting means comprising, a housing, a fixed guide means presented from said housing, at least first and second slotted apertures in said guide means defining, respectively, first and second courses, a link means movably mounted in said housing, said link means having a slotted aperture registrable with that slotted aperture in said guide means defining said first course, a throw arm movable selectively along said courses in contact with selective of said slotted apertures, a handle to move said throw arm, said throw arm connected to the first motion transmitting means for actuation thereof when said throw arm is moved along the registered apertures in said guide means and link means which define said first course, said link means connected to the second motion transmitting means for actuation thereof when said link means moves, movement of said link means occasioned in response to movement of said throw arm only along the second aperture of said guide means.

2. A single lever control unit as set forth in claim 1, in which said throw arm is movable in reciprocal directions along both said first and second courses, an electrical switch means mounted in said control unit, said switch means being tripped by movement of said throw arm in at least one direction along said first course and by movement of said throw arm in either direction along said second course.

3. A single lever control, as set forth in claim 1, in which the first aperture in said guide plate is substantially aligned with the first motion transmitting means and the second aperture in said guide plate is generally curvilinear and oriented substantially transversely of said first aperture.

4. A single lever control, as set forth in claim 3, in which an electrical switch means is mounted on said link means in substantial alignment with, and in proximity to, the slotted aperture in said link means so that said switch means can be tripped by movement of said throw arm along the aperture in said link means.

5. A single lever control, as set forth in claim 4, in which the throw arm moves along the aperture in said link means when traversing the first aperture in said guide plate and when traversing the second aperture in said guide plate.

6. A single lever control unit comprising a housing, a handle movably carried on said housing, a throw arm movable in response to movement of said handle, a guide plate carried on said housing to delineate movement of said throw arm along at least two courses, a link means movably mounted in said housing, connecting means between said link means and said throw arm, said connecting means permitting said throw arm to move along a first course with said link means remaining stationary and accomplishing movement of said link means in response to movement of said throw arm along the second course, a first motion transmitting means operatively connected to said throw arm for actuation only upon movement of said throw arm in said first direction, and second motion transmitting means operatively connected to said link means for actuation upon movement thereof.

References Cited
UNITED STATES PATENTS

| | | | |
|---|---|---|---|
| 2,762,234 | 9/1956 | Dodd | 74—471 |
| 2,964,964 | 12/1960 | Craig | 74—471 |
| 2,700,106 | 1/1955 | Taylor | 74—471 |
| 3,308,675 | 3/1967 | Jonsson | 74—471 |
| 3,369,100 | 2/1968 | Kussy et al. | 74—471 |

FRED C. MATTERN, Jr., Primary Examiner

W. S. RATLIFF, Jr., Assistant Examiner